(12) United States Patent
Esinovskaya et al.

(10) Patent No.: US 9,721,018 B2
(45) Date of Patent: Aug. 1, 2017

(54) SYSTEM AND METHOD FOR DISPLAYING OF MOST RELEVANT VERTICAL SEARCH RESULTS

(71) Applicant: YANDEX EUROPE AG, Luzern (CH)

(72) Inventors: Irina Viktorovna Esinovskaya, Moscow (RU); Dmitry Vladimirovich Kozlov, Moscow (RU); Mikhail Jurievich Kosarev, Moscow Region (RU); Mikhail Gennadievich Milnikov, Moscow Region (RU)

(73) Assignee: YANDEX EUROPE AG, Luzern (CH)

( * ) Notice: Subject to any disclaimer, the term of this patent is extended or adjusted under 35 U.S.C. 154(b) by 0 days.

(21) Appl. No.: 15/202,682

(22) Filed: Jul. 6, 2016

(65) Prior Publication Data

US 2016/0328477 A1    Nov. 10, 2016

Related U.S. Application Data

(63) Continuation of application No. 14/913,499, filed as application No. PCT/IB2014/061924 on Jun. 3, 2014.

(30) Foreign Application Priority Data

Aug. 29, 2013 (RU) ................................ 2013140368

(51) Int. Cl.
*G06F 17/30* (2006.01)

(52) U.S. Cl.
CPC .... *G06F 17/30864* (2013.01); *G06F 17/3051* (2013.01); *G06F 17/3053* (2013.01); *G06F 17/30554* (2013.01); *G06F 17/30867* (2013.01)

(58) Field of Classification Search
CPC ........... G06F 17/30864; G06F 17/3051; G06F 17/3053; G06F 17/30554; G06F 17/30867
USPC ........................................................ 707/728
See application file for complete search history.

(56) References Cited

U.S. PATENT DOCUMENTS

| 7,747,639 | B2 | 6/2010 | Kasperski et al. |
| 7,966,309 | B2 | 6/2011 | Shacham et al. |
| 8,332,397 | B2 | 12/2012 | Ramer et al. |
| 2002/0165860 | A1 | 11/2002 | Glover et al. |
| 2003/0195877 | A1 | 10/2003 | Ford et al. |

(Continued)

FOREIGN PATENT DOCUMENTS

| WO | 2009108726 A1 | 9/2009 |
| WO | 2013121181 A1 | 8/2013 |

OTHER PUBLICATIONS

International Search Report from PCT/IB2014/061924, Lee W. Young; Jan. 13, 2015.

(Continued)

*Primary Examiner* — Evan Aspinwall
(74) *Attorney, Agent, or Firm* — BCF LLP

(57) ABSTRACT

There is provided a method and a system for conducting a search and presenting results. The method can be executed at a server. The method comprises receiving a search query from an electronic device associated with a user; responsive to the search query, generating a search query result set, the search query result set including a vertical search result; determining a confidence level that the vertical search result is the most relevant to the search query; responsive to the confidence level being above a pre-determined threshold, causing the electronic device to display exclusively the vertical search result.

20 Claims, 12 Drawing Sheets

(56) References Cited

U.S. PATENT DOCUMENTS

| | | |
|---|---|---|
| 2005/0165753 A1 | 7/2005 | Chen et al. |
| 2005/0192946 A1 | 9/2005 | Lu et al. |
| 2006/0122994 A1 | 6/2006 | Kapur et al. |
| 2007/0050339 A1 | 3/2007 | Kasperski et al. |
| 2007/0266015 A1 | 11/2007 | Shakib et al. |
| 2007/0276803 A1 | 11/2007 | Shakib et al. |
| 2010/0036827 A1 | 2/2010 | Jain |
| 2010/0281012 A1 | 11/2010 | Imig et al. |
| 2011/0208710 A1 | 8/2011 | Lesavich |
| 2012/0209705 A1* | 8/2012 | Ramer .............. G06F 17/30867 705/14.51 |
| 2012/0323898 A1 | 12/2012 | Kumar et al. |

OTHER PUBLICATIONS

International Preliminary Report on Patentability from PCT/IB2014/061924, Marc Somers, Sep. 29, 2015.

* cited by examiner

SYSTEM AND METHOD FOR DISPLAYING OF MOST RELEVANT VERTICAL SEARCH RESULTS

CROSS-REFERENCE

The present application is a continuation of U.S. patent application Ser. No. 14/913,499 which is a National Stage of PCT/IB2014/061924 filed on Jun. 3, 2014 which itself claims convention priority to Russian Utility Application No. 2013140368, filed on Aug. 29, 2013, entitled " СИСТЕМА ОТОБРАЖЕНИЯ НАИБОЛЕЕ РЕЛЕВАНТНЫХ РЕЗУЛЬТАТОВ ВЕРТИКАЛЬНОГО ПОИСКА ". These applications are incorporated by reference herein in their entirety.

FIELD

The present technology relates to search engines in general and specifically to a system and method for displaying of most relevant vertical search vertical.

BACKGROUND

Various global or local communications networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

Generally speaking, a given user can access a resource on the communications network by two principle means. The given user can access a particular resource directly, either by typing an address of the resource (typically an URL or Universal Resource Locator, such as www.webpage.com) or by clicking a link in an e-mail or in another web resource. Alternatively, the given user may conduct a search using a search engine to locate a resource of interest. The latter is particularly suitable in those circumstances, where the given user knows a topic of interest, but does not know the exact address of the resource she is interested in.

For example, the given user may be interested in viewing pictures of Britney Spears, but may not be aware of a particular resource that would present such information. Alternatively, the given user may be interested in locating the closest Starbucks coffee shop, but again may not be aware of a particular web resource to provide such location services. In these fictitious (yet practical) circumstances, the given user may run a web search using a search engine.

When the given user runs a web search using the search engine, she generally has two priorities. She wants the search engine to locate the most relevant results and she wants the results relatively fast.

U.S. Pat. No. 7,966,309 granted to Shacham et al teaches a computer-implemented method. The method includes receiving from a remote device a search query, generating a plurality of different category-directed result sets for the search query, determining an order for the plurality of category-directed result sets based on the search query, and transmitting the plurality of category-directed result sets to the remote device, in a manner that the result sets are to be displayed in the remote device in the determined order.

SUMMARY

It is an object of the present technology to ameliorate at least some of the inconveniences present in the prior art.

In one aspect, implementations of the present technology provide a method of conducting a search and presenting results. The method can be executable at a server. The method comprises receiving a search query from an electronic device associated with a user; responsive to the search query, generating a search query result set, the search query result set including a vertical search result; determining a confidence level that the vertical search result is the most relevant to the search query; responsive to the confidence level being above a pre-determined threshold, causing the electronic device to display exclusively the vertical search result.

In some implementation, the server transmits the search query to a search cluster and receives ranked search result set therefrom, the search cluster being configured to perform a general search. In some implementation, the server further transmits the search query to a plurality of vertical search modules and receives the vertical search result therefrom.

In some implementations, the server transmits the search query to a search cluster and receives ranked search result set therefrom, the search cluster being configured to perform a general search and a vertical search.

In some implementations, as part of conducting the general search, the search cluster performs a multi-level meta search.

In some implementations, the server receives the vertical search result as a widget application. The server can then determine the confidence level based on analyzing one or more of: (i) the data maintained within the widget application, (ii) hierarchical position of the widget application within the ranked result set, and (iii) the intent weight associated with the search query; (iv) determinative words associated with the search query; (v) stop words associated with the search query and (vi) frequency of the search query and a response from the widget application combination when other users perform similar search queries.

The server can determine the intent weight associated with the search query by parsing the search query to determine a search intent parameter and a results intent parameter In some implementations, if the confidence level is below the pre-determined threshold, the server further causes the electronic device to display a standard search result page (SERP). The standard SERP includes both the general search results and the vertical search results. In some implementations, the vertical search results are displayed by using respective widget applications.

In some implementations, the method is executed without receiving an affirmative action from the user. In other implementations, the method is triggered upon the user activating a feature associated with the method. The feature can be activated in a setting mode of the electronic device.

In another aspect, implementations of the present technology provide a server comprising computer usable information storage medium that includes computer-readable instruction. The server is configured to: receive a search query from an electronic device associated with a user; responsive to the search query, generate a search query result set, the search query result set including a vertical search result; determine a confidence level that the vertical search result is the most relevant to the search query; responsive to the confidence level being above a pre-determined threshold, cause the electronic device to display exclusively the vertical search result.

In yet another aspect, implementations of the present technology provide a method of conducting a search and receiving search results, the method executable at an electronic device associated with a user. The method comprises: receiving a search query from the user and transmitting the search query to a server; receiving a trigger from the server, the trigger being instrumental in causing the electronic device to display search results, the trigger having been generated by the server, the server having executed the steps of: responsive to the search query, generating a search query result set, the search query result set including a vertical search result; determining a confidence level that the vertical search result is the most relevant to the search query; responsive to the confidence level being above a pre-determined threshold, generating the trigger that is for causing the electronic device to display exclusively the vertical search result.

In a further aspect, implementations of the present technology provide an electronic device comprising computer usable information storage medium that includes computer-readable instruction, which instructions when executed, cause the electronic device to execute: receiving a search query from the user and transmitting the search query to a server; receiving a trigger from the server, the trigger being instrumental in causing the electronic device to display search results, the trigger having been generated by the server, the server having executed the steps of: responsive to the search query, generating a search query result set, the search query result set including a vertical search result; determining a confidence level that the vertical search result is the most relevant to the search query; responsive to the confidence level being above a pre-determined threshold, generating the trigger that is for causing the electronic device to display exclusively the vertical search result.

In the context of the present specification, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
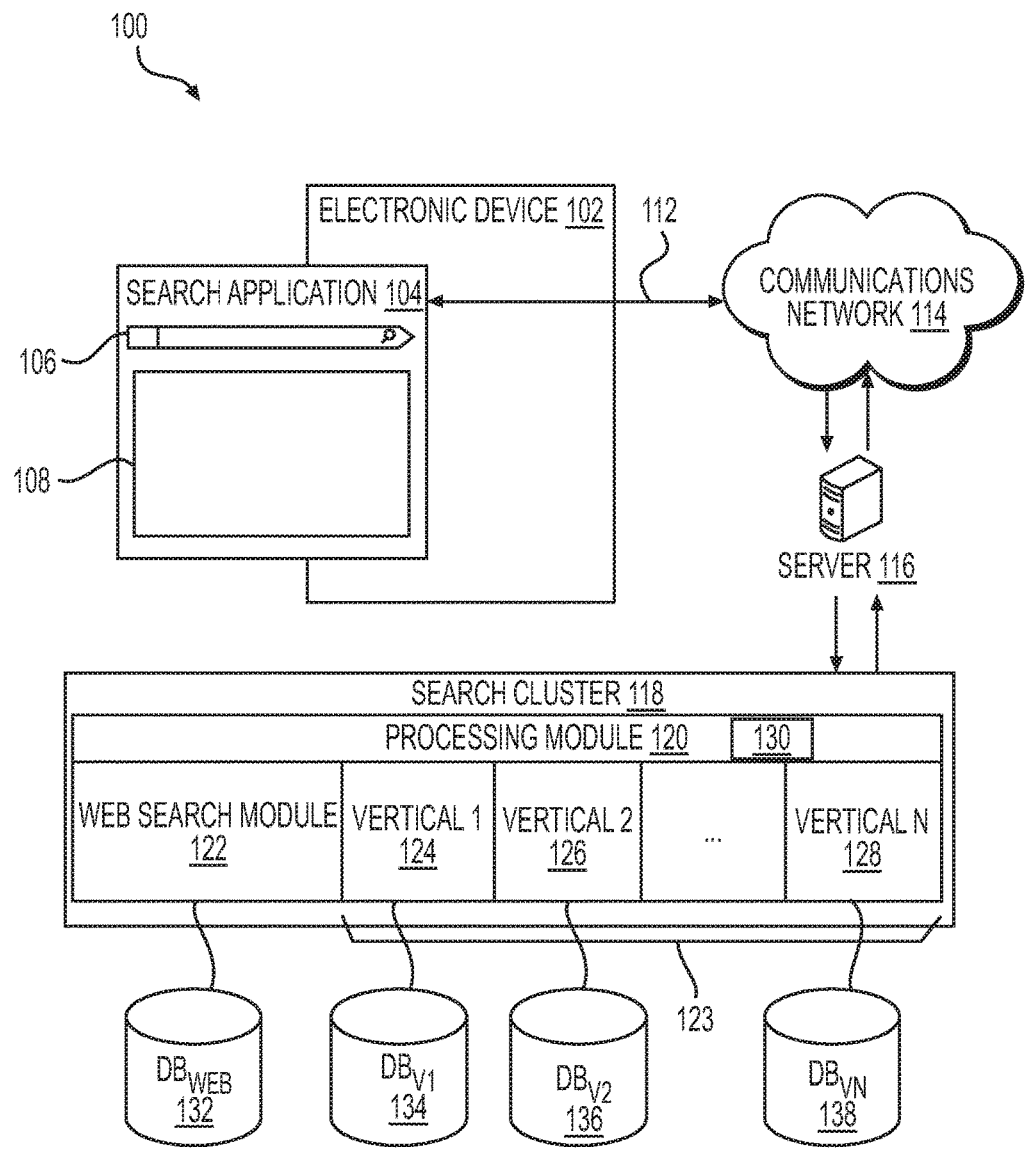
FIG. 1 is a schematic diagram depicting a system 100, the system 100 being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises an electronic device 102. The electronic device 102 is typically associated with a user (not depicted) and, as such, can sometimes be referred to as a "client device". It should be noted that the fact that the electronic device 102 is associated with the user does not need to suggest or imply any mode of operation—such as a need to log in, a need to be registered or the like.

The implementation of the electronic device 102 is not particularly limited, but as an example, the electronic device 102 may be implemented as a personal computer (desktops, laptops, netbooks, etc.), a wireless communication device (a cell phone, a smartphone, a tablet and the like), as well as network equipment (a router, a switch, or a gateway). The electronic device 102 comprises hardware and/or software and/or firmware (or a combination thereof), as is known in the art, to execute a search application 104. Generally speaking, the purpose of the search application 104 is to enable the user (not depicted) to execute a search, such as the above mentioned web search using the above-mentioned search engine.

How the search application 104 is implemented is not particularly limited. One example of the search application 104 may be embodied in a user accessing a web site associated with a search engine to access the search application 104. For example, the search application can be accessed by typing in an URL associated with Yandex search engine at www.yandex.ru. It should be expressly understood that the search application 104 can be accessed using any other commercially available or proprietary search engine.

In alternative non-limiting embodiments of the present technology, the search application 104 may be implemented as a browser application on a portable device (such as a wireless communication device). For example (but not limited) to those implementations, where the electronic device 102 is implemented as a portable device, such as for example, Samsung™ Galaxy™ SIII, the electronic device may be executing a Yandex browser application. It should be expressly understood that any other commercially available or proprietary browser application can be used for implementing non-limiting embodiments of the present technology.

Generally, speaking, the search application 104 comprises a query interface 106 and a search result interface 108. The general purpose of the query interface 106 is to enable the user (not depicted) to enter her query or a "search string". The general purpose of the search result interface 108 is to provide search results that are responsive to the user query entered into the query interface 106. How the user query is processed and how the search results are presented will be described in detail herein below.

The electronic device 102 is coupled to a communications network 114 via a communication link 112. In some non-limiting embodiments of the present technology, the communications network 114 can be implemented as the Internet. In other embodiments of the present technology, the communications network 114 can be implemented differently, such as any wide-area communications network, local-area communications network, a private communications network and the like.

How the communication link 112 is implemented is not particularly limited and will depend on how the communication device 102 is implemented. Merely as an example and not as a limitation, in those embodiments of the present technology where the electronic device 102 is implemented as a wireless communication device (such as a smart-phone), the communicated link 102 can be implemented as a wireless communication link (such as but not limited to, a 3G communications network link, a 4G communications network link, a Wireless Fidelity, or WiFi® for short, Bluetooth® and the like). In those examples, where the communication device 102 is implemented as a notebook computer, the communication link can be either wireless (such as the Wireless Fidelity, or WiFi® for short, Bluetooth® or the like) or wired (such as an Ethernet based connection).

It should be expressly understood that implementations for the electronic device 102, the communication link 112 and the communications network 114 are provided for illustration purposes only. As such, those skilled in the art will easily appreciate other specific implementational details for the electronic device 102, the communication link 112 and the communications network 114. As such, by no means, examples provided herein above are meant to limit the scope of the present technology.

Also coupled to the communications network is a server 116. The server 116 can be implemented as a conventional computer server. In an example of an embodiment of the present technology, the server 116 can be implemented as a Dell™ PowerEdge™ Server running the Microsoft™ Windows Server™ operating system. Needless to say, the server 116 can be implemented in any other suitable hardware and/or software and/or firmware or a combination thereof. In the depicted non-limiting embodiment of present technology, the server 116 is a single server. In alternative non-limiting embodiments of the present technology, the functionality of the server 116 may be distributed and may be implemented via multiple servers.

The server 116 is communicatively coupled (or otherwise has access) to a search cluster 118. The general purpose of the search cluster 118 is to perform searches in response to the user queries inputted via the query interface 106 and to output search results to be presented to the user using the search results interface 108. What follows is a description of one non-limiting embodiment of the implementation for the search cluster 118. However, it should be understood that there is a number of alternative non-limiting implementations of the search cluster 118 possible. It should be also expressly understood that in order to simplify the description presented herein below, the configuration of the search cluster 118 has been greatly simplified. It is believed that those skilled in the art will be able to appreciate implementational details for the search cluster 118 and for components thereof that may have been omitted for the purposes of simplification of the description.

Generally speaking the purpose of the search cluster 118 is to (i) conduct searches (details will be explained herein below); (ii) execute analysis of search results and perform ranking of search results; (iii) group results and compile the search result page (SERP) to be outputted to the electronic device 102. How the search cluster 118 is configured to execute searches is not particularly limited. Those skilled in the art will appreciate several ways and means to execute the search using the search cluster 118 and as such, several structural components of the search cluster 118 will only be described at a high level.

In some non-limiting embodiments of the present technology, the search cluster 118 comprises a processing module 120. The processing module 120 can execute several searches, including but not limited to, a general search and a vertical search. To that end, the processing module 120 comprises (or has access to) a web search module 122. The web search module 122 is configured to perform general web searches, as is known to those of skill in the art.

In some non-limiting embodiments of the present technology, processing module 120 can execute what is known as a multi-level meta search. These non-limiting embodiments can be implemented, for example, to increase the speed of the search and to obtain more relevant search results. In some non-limiting embodiments of the present technology, the web search module 122 can be responsible for executing the multi-level meta search.

To that end, the web search module 122 can execute the top level meta search, as will be discussed in greater detail herein below. The web search module 122 may also have access to a database $DB_{WEB}$ 132, which database $DB_{WEB}$ 132 may be accessed by the web search module 122 to conduct a middle level meta search and a bottom level meta search. Even though the database $DB_{WEB}$ 132 is depicted as a single entity, in some non-limiting embodiments of the present technology, the database $DB_{WEB}$ 132 can be implemented in a distributed manner, for example as a dedicated database for each of the middle level meta search and the bottom level meta search.

Also, even though the web search module 122 is depicted as a single entity, in alternative non-limiting embodiments of the present technology the web search module 122 may also be implemented in a distributed manner For example, each of the distributed implementations of the web search modules 122 may be dedicated to search queries originating from a particular geographical region. In those non-limiting embodiments of the present technology, the processing module 120 may determine a location and/or an IP address associated with the electronic device 102 associated with the user who is submitting the search query. Based on the so-determined location and/or the IP address of the electronic device 102, the processing module 120 may forward the search query to one of the distributed web search modules 122 to perform the top level meta search.

The web search module 122 may also forward a request to the database $DB_{WEB}$ 132 to perform the middle level meta search and the bottom level meta search. In some non-limiting embodiments of the present technology, the database $DB_{WEB}$ 132 may have a portion (or a separate database) dedicated to the middle level meta search (for example, having a repository of frequently asked questions). The identification of the portion (or a separate database) of the database $DB_{WEB}$ 132 responsible for the middle level meta search may be executed by the database $DB_{WEB}$ 132 based on a so-called "CRC-code". The portion (or a separate database) of the database $DB_{WEB}$ 132 responsible for the middle level meta search may send a given generated query to a portion (or a separate database) of the database $DB_{WEB}$ 132 responsible for the bottom level meta search.

However, in some non-limiting embodiments of the present technology, where the search query is already saved in cache of the portion (or the separate server) of the database $DB_{WEB}$ 132 as part of the middle level meta search, the step of transmitting the query to the portion (or the separate database) of the database $DB_{WEB}$ 132 responsible for the bottom level meta search may be omitted altogether. Naturally, in alternative embodiments of the present technology, even if the search query is already saved in cache of the portion (or the separate server) of the database $DB_{WEB}$ 132 as part of the middle level meta search, the step of transmitting the query to the portion (or the separate database) of the database $DB_{WEB}$ 132 responsible for the bottom level meta search may still be performed.

The processing module 120 further comprises (or has access to) a plurality of vertical search modules 123. In the depicted non-limiting embodiment, the plurality of vertical search modules includes a vertical 1 module 124, a vertical 2 module 126 and a vertical N module 128. It should be expressly understood that the number of modules within the plurality of vertical search modules 123 is not meant to be a limitation of embodiments of the present technology.

Merely for the purposes of ease of illustration, it shall be assumed that the vertical 1 module 124 is implemented as a vertical search domain for searching maps and other geographical information. As such, it can be said that the vertical 1 module 124 implements a map vertical search engine or, simply, a map service.

Furthermore, it shall be assumed that the vertical 2 module 126 is implemented as a vertical search module for searching images. As such, it can be said that the vertical 2 module 126 implements an images vertical search domain or, simply, an image service. For the various examples to be provided herein below, it shall be assumed, selectively, that the vertical N search module 128 can implement one of sports news, movies, weather, translation, wiki or movie theater services. It should be expressly understood that a number of additional or different services can be implemented as part of the plurality of vertical search modules 123.

In some non-limiting embodiments of the present technology, any given one of the plurality of vertical search modules 123 comprises or has access to one or more databases. These one or more databases host data associated with the particular service implemented by the given one of the plurality of vertical search modules 123.

To that extent, the vertical 1 module 124 has access to a database $DB_{V1}$ 134. Recalling that the vertical 1 module 124 implements a map service, the database $DB_{V1}$ 134 contains information related to geographical location of various objects and the associated maps. The vertical 2 module 126 has access to a database $DB_{V2}$ 136. Recalling that the vertical 2 module 126 implements an image service, the database $DB_{V2}$ 136 can host a repository of various images. By the same token, the vertical N module 128 has access to a database $DB_{VN}$ 138. Recalling that the vertical N module 128 implements selectively one of sports news, movies, weather, translation or movie theater services, the database $DB_{VN}$ 138 can host a repository of data associated with the respective selective service.

Additionally or optionally and, as known to those skilled in the art, the one or more databases (such as the database $DB_{V1}$ 134, $DB_{V2}$ 136 and $DB_{VN}$ 138) may be segregated into one or more separate databases. These segregated databases may be portions of the same physical database (such as the database $DB_{V1}$ 134, database $DB_{V2}$ 136 and database $DB_{VN}$ 138) or may be implemented as separate physical entities. For example, one database within, let's say, the database $DB_{V2}$ 136 could host the most popular/most frequently requested images in a given category, while another database within the database $DB_{V2}$ 136 could host all the images available within the image service. Needless to say, the above has been provided as an illustration only and several additional possibilities exist for implementing embodiments of the present technology.

Furthermore, it is possible that some of the plurality of vertical search modules 123 may not implement a separate database. This is particularly true, but is not limited to, for example, the vertical N module 128 implementing a weather service. In this example, the vertical N module 128 implementing the weather service may not have a dedicated database, but may rather have access to a service widget repository 130. The service widget repository 130 may be implemented as data repository for one or more widget applications, as will be described in greater detail here below.

Each of the plurality of vertical search modules 123 is configured to perform vertical searches within the respective databases (i.e. database $DB_{V1}$ 134, database $DB_{V2}$ 136 and database $DB_{VN}$ 138). However, it should be noted that the search capabilities of the plurality of vertical search modules 123 are not limited to searching the respective databases (i.e. database $DB_{V1}$ 134, database $DB_{V2}$ 136 and database $DB_{VN}$ 138). As such, the plurality of vertical search modules 123 may perform other searches, as the need may be.

Also, for the purposes of the description presented herein, the term "vertical" (as in vertical search or in vertical search domain) is meant to connote a search performed on a subset of a larger set of data, the subset having been grouped pursuant to an attribute of data. For example, to the extent that the vertical 2 module 126 implements an image service, the vertical 2 module 126 searches a subset (i.e. images) of the set of data (i.e. all the data potentially available for searching), the subset of data being stored in the database $DB_{V2}$ 136.

In some non-limiting embodiments of the present technology, some or all of the search results returned by a respective one of the vertical search modules 123 can be formatted into a widget application. In a sense, the widget application is a particular way to represent the search results from a given vertical search of one of the plurality of vertical search modules 123. Examples of the widget applications are depicted with reference to FIG. 4 and FIG. 5, as an illustration only to enable the reader to appreciate what a widget application is. For the purposes of this illustration, we shall assume that the electronic device 102 is implemented as iPad® and the search application 104 is implemented as a Yandex Browser application. Furthermore, it shall be assumed that the user has entered a search query, using the query interface 106 for "Panda".

Figure 4:
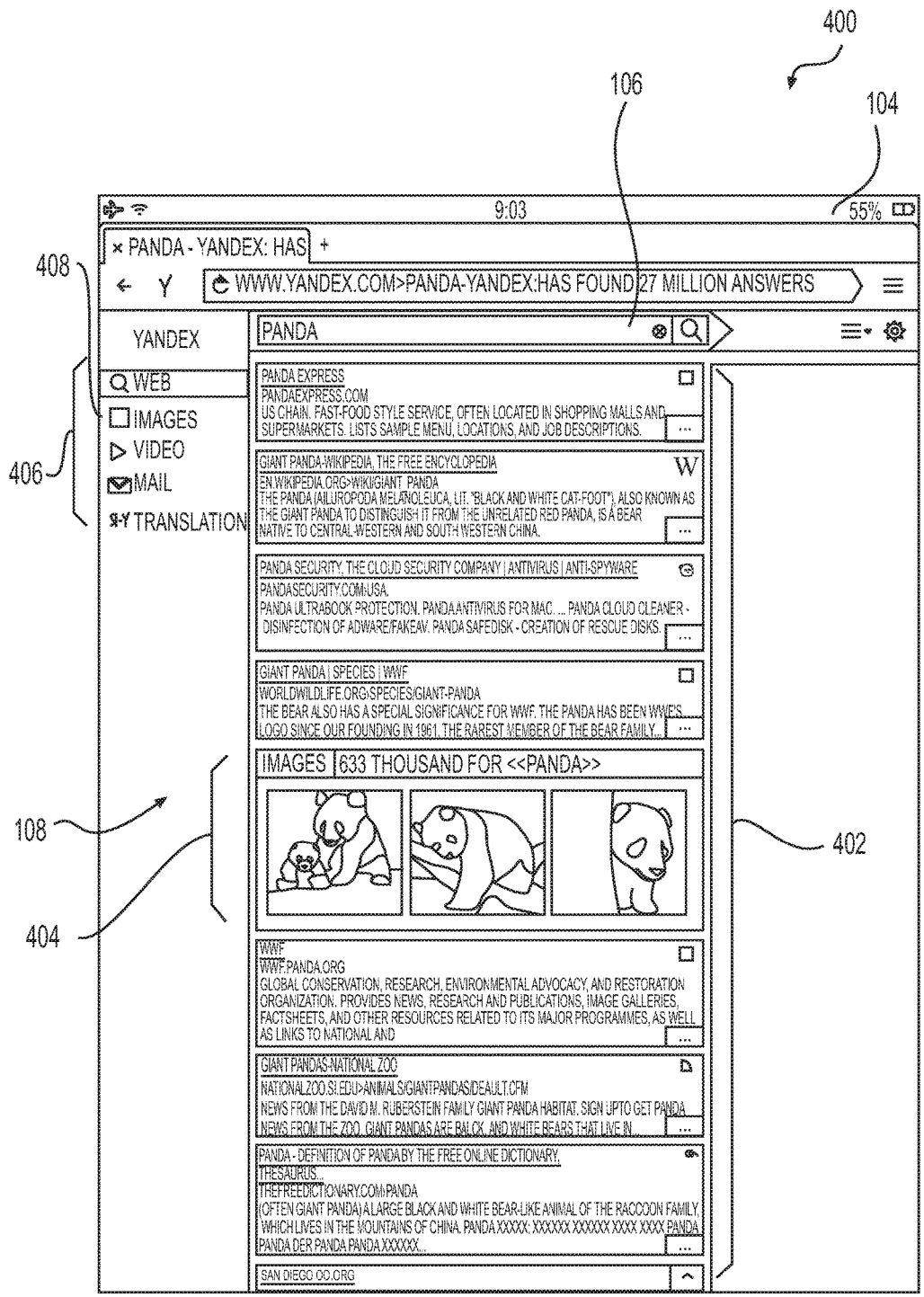
FIG. 4 illustrates a screen shot of a standard Search Results Page (SERP) including a widget application.
Figure 5:
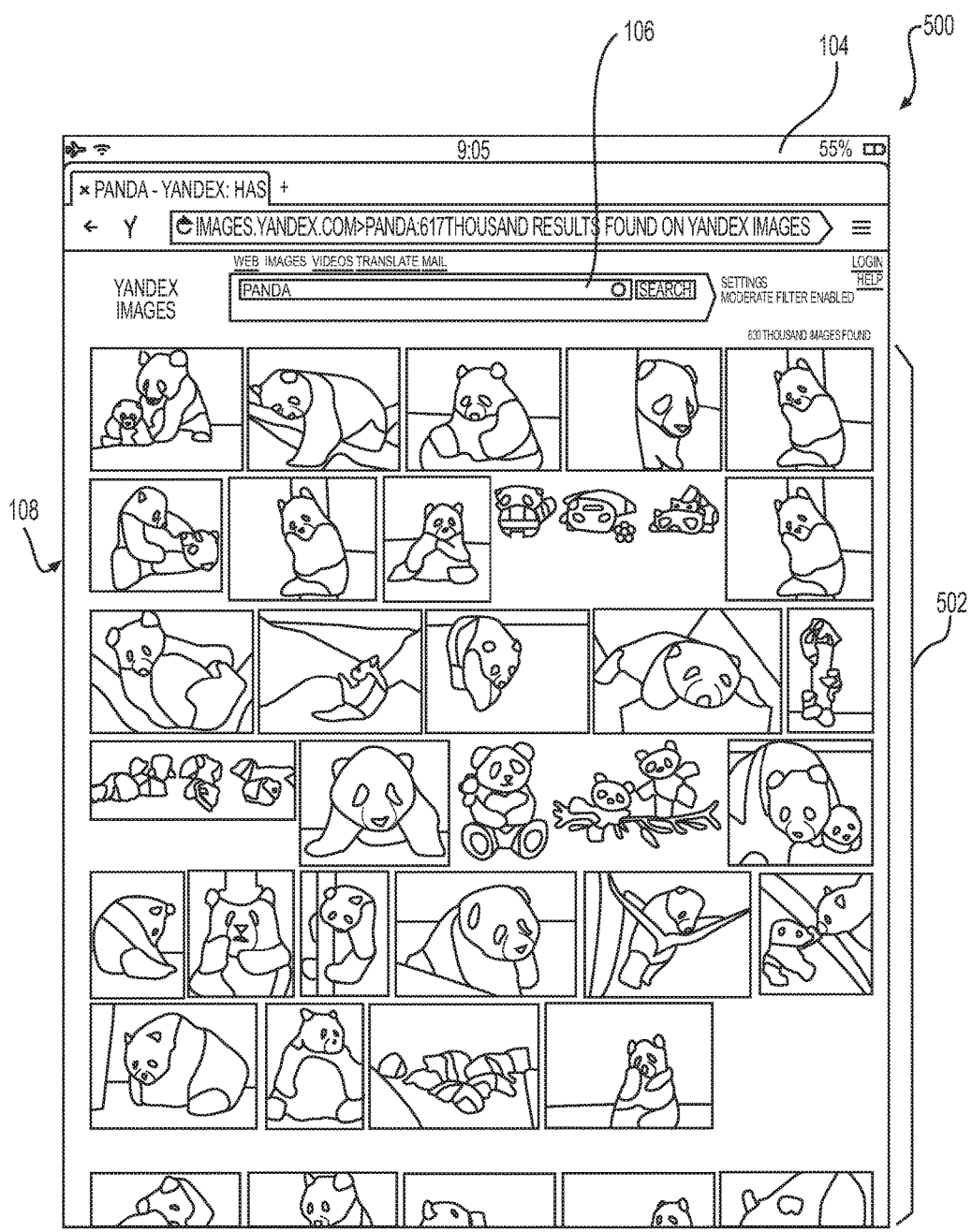
FIG. 5 illustrates a screen shot of the SERP that includes exclusively the vertical results of an image service.

FIG. 4 illustrates a screen shot of a standard Search Results Page (SERP) including a widget application and FIG. 5 illustrates the SERP that includes exclusively the vertical results of an image service. It should be noted that both FIG. 4 and FIG. 5 are for illustration purposes only to assist in understanding of the widget application and the vertical search results concepts. It should also be understood that both FIG. 4 and FIG. 5 contain a multitude of information, only relevant portions of which will be enumerated and described.

FIG. 4 depicts a screen shot 400, the screen shot 400 showing the search application 104 having the query interface 106 with a query string "Panda" and the results interface 108 showing the search results for the search query containing "Panda". It should be noted that the results depicted here for illustration are just the standard SERP, the SERP being implemented in accordance with known techniques. The results interface 108 depicts a search result set 402. The search result set 402 includes inter alia a widget application 404, which in this case is the widget application 404 configured to output results of a search vertical implementing an image service. As such, the widget application 404 depicts a snapshot of the images that are responsive to the search query "Panda". In some implementations, it is possible that the widget application 404 shows a selection of the most relevant images (or other data) within the given vertical search.

The screen shot 400 also includes a set of actuating buttons 406. One of the actuating buttons 406 is an images vertical button 408. By either clicking on the images vertical button 408 or onto the widget application 404 itself, the user is taken to the associated vertical search results, depicted with reference to FIG. 5, which depicts a screen shot 500. The screen shot 500 shows the search application 104 having the query interface 106 with a query string "Panda" and the results interface 108 showing the results for the search query "Panda". The results interface 108 includes a vertical output screen 502, which vertical output screen 502 in this case depicts the results from the images vertical search responsive to the search query "Panda". It is noted that within the screen shot 500, the results interface 108 exclusively displays the vertical search results (but the user had to take an affirmative action to get there, unlike what is to be described herein below).

As has been already noted, the description of FIG. 4 and FIG. 5 is meant to illustrate to the reader the meaning of the widget application, as well as its functionality.

Returning now to the description of FIG. 1, merely for the purposes of simplifying the description to be presented herein, only a high level description of one approach to executing a search by the search cluster 118 will be presented herein below. It is expected that those skilled in the art will be able to configure the search cluster 118 in any number of known ways without undue experimentation or burden.

As has been mentioned above, in some non-limiting embodiments of the present technology, the processing module 120 can be configured to execute a search in a multi-level meta fashion. In some non-limiting embodiments of the present technology, the processing module 120 includes an http-interface (not depicted) for receiving the search request from the server 116.

When the processing module 120 receives the search query from the server 116, it sends the search query to the web search module 122. As has been alluded to above, in some non-limiting embodiments of the present technology, the sending of the search request to the web search module 122 may be based on the location and/or IP address associated with the electronic device 102, as may be determined by the processing module 120. The web search module 122 performs a search, which in some non-limiting embodiments of the present technology may include a multi-level meta search. To that extent, the web search module 122 executes some or all of the top level meta search, middle level middle search and the bottom level meta search.

In parallel or in sequence, the processing module 120 also transmits the search query to the plurality of vertical search modules 123 for performing the respective vertical searches. The responses from all the search sources (the plurality of vertical search modules 123 and the web search module 122, which may include the bottom level meta search, the middle level meta search and the top level meta search) are received and amalgamated by the processing module 120.

The processing module 120 then executes a ranking function to generate a ranked search results set. In other words, the processing module 120 ranks the search results by their relevancy to the search query submitted by the user. As those skilled in the art will appreciate, relevancy within this description shall mean how responsive a given search result is to the user query.

Those skilled in the art will appreciate various techniques available for ranking search results. Just as an example and not as a limitation, some of the known techniques for ranking search results by relevancy are based on some or all of: (i) how popular a given search query or a response thereto is in either the plurality of vertical search modules 123 or in the bottom level search (or any other level of the multi level meta search); (ii) how many results have been returned by either the plurality of vertical search modules 123 or in the bottom level search (or any other level of the multi level meta search); (iii) whether the search query contains any determinative terms (such as "images", "movies", "weather" or the like), (iv) how often a particular search query is typically used with determinative terms by other users; and (v) how often other uses performing a similar search have selected a particular resource or a particular vertical search results when results were presented using the standard SERP.

Within this description, the term "determinative term" shall mean a word or a string of words indicative of the fact that a given search result is more likely to have the most relevant response to the user search query. For example, if the search query contains the term "images" it can be determined, by the processing unit 120, that the vertical 2 module 126, being implemented as an image service, is likely to be the service that contains the most relevant results to the user query. Needless to say, only a sub set of these, or these combined to others or any combination of other factors my be taken into account when raking the search results for relevancy.

The search cluster 118 is then configured to transmit ranked search results to the server 116.

It should be noted that the above described architecture of system 100 of FIG. 1 has been depicted as an example only. Other non-limiting embodiments for the architecture of FIG. 1 are possible. For example, in some alternative non-limiting embodiments of the present technology and with reference to FIG. 3 another embodiment of a system 300 is depicted, the system 300 being implemented in accordance with another non-limiting embodiment of the present technology.

The system 300 shares certain implementational details with the system 100 of FIG. 1 and, as such, the focus of the description to be presented herein below will be on the differences between the system 300 and the system 100. It should be also noted that like elements are depicted with like numerals.

Just like the system 100, the system 300 comprises an electronic device 102. The implementation of the electronic device 102 is not particularly limited, but as an example, the electronic device 102 may be implemented as a personal computer (desktops, laptops, netbooks, etc.), a wireless communication device (a cell phone, a smartphone, a tablet and the like), as well as network equipment (a router, a switch, or a gateway). The electronic device 102 comprises hardware and/or software and/or firmware (or a combination thereof), as is known in the art, to execute a search application 104. Generally speaking, the purpose of the search application 104 is to enable the user (not depicted) to execute a search, such as the above mentioned web search using the above-mentioned search engine. The search application 104 can be implemented much akin to the various embodiments and examples described in regard to FIG. 1.

Generally speaking, the search application 104 comprises a query interface 106 and a search result interface 108. The general purpose of the query interface 106 is to enable the user (not depicted) to enter her query or a "search string". The general purpose of the search result interface 108 is to provide search results that are responsive to the user query entered into the query interface 106. The electronic device 102 is in communication with the server 116 (which can be implemented via a communications network, much akin to the communications network 114 of FIG. 1, which has been omitted for the sake of simplicity of illustration). The server 116 can be implemented in the same fashion as described with reference to FIG. 1.

The server 116 is communicatively coupled (or otherwise has access) to a search cluster 318. According to these embodiments of the present technology, the search cluster 318 performs general searches in response to the user queries inputted via the query interface 106 and outputs search results to be presented to the user using the search results interface 108. Within these non-limiting embodiments of the present technology, the search cluster 318 comprises or otherwise has access to a database 322. Within these non-limiting embodiments of the present technology, the search cluster 316 performs a search, such as the above mentioned multi-level meta search, using the database 322.

In these non-limiting embodiments of the present technology, the server 116 is communicatively coupled (or otherwise has access) to a plurality of vertical search modules 323. In the depicted non-limiting embodiment, the plurality of vertical search modules 323 includes a vertical 1 module 324, a vertical 2 module 326 and a vertical N module 328. It should be expressly understood that the number of modules within the plurality of vertical search modules 323 is not meant to be a limitation of embodiments of the present technology.

The vertical 1 module 324 comprises (or otherwise has access to) a database $DB_{V1}$ 334. The vertical 2 module 326 comprises (or otherwise has access to) a database $DB_{V2}$ 336. By the same token, the vertical N module 128 comprises (or otherwise has access to) a database $DB_{VN}$ 338.

Additionally or optionally and, as known to those skilled in the art, the one or more databases (such as the database 322, database $DB_{V1}$ 334, $DB_{V2}$ 336 and $DB_{VN}$ 338) may be segregated into separate databases. These segregated databases may be portions of the same physical database (such as the database 322, database $DB_{V1}$ 334, $DB_{V2}$ 336 and $DB_{VN}$ 338) or may be implemented as separate databases. Akin to what was described in reference to FIG. 1, it is possible that some of the plurality of vertical search modules 323 may not implement a separate database.

As far as operation of the system 300 is concerned, it is quite similar to that of system 100. However, since in the embodiment of FIG. 3, the search cluster 318 and the plurality of vertical search modules 323 are independently accessible by the server 116, the server 116 can be responsible for triggering execution of the various searches within the non-limiting embodiments of FIG. 3, rather than the search cluster 118, which is the case within the non-limiting embodiments of FIG. 1.

Given the architecture described with reference to FIG. 1 and FIG. 3, it is possible to execute a method of conducting a search and presenting search results. The method of conducting the search and presenting search results can be conveniently executed on the server 116 of FIG. 1 or FIG. 3. To that end, the server 116 includes computer usable information storage medium storing computer instructions, which instructions when executed, cause the server 116 to execute steps of the method described herein below. For the ease of description, the method below will be described with reference to the server 116 of FIG. 1. Description presented herein below will apply mutatis mutandis to the execution of the server 116 of FIG. 3.

Figure 2:
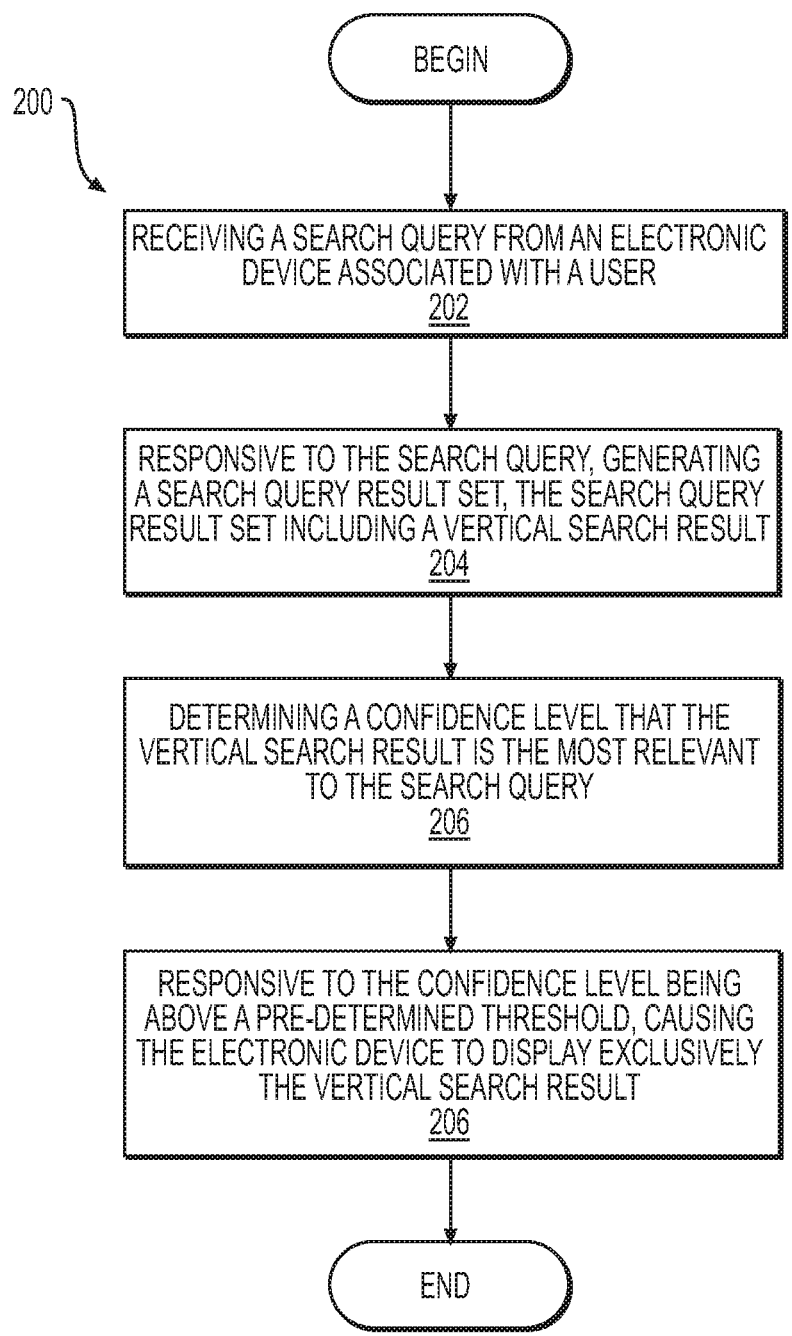
FIG. 2 is a block diagram depicting a method 200, the method 200 being implemented within the system 100 of FIG. 1 and being implemented according with non-limiting embodiments of the present technology.

Reference will now be made to FIG. 2, which depicts a block diagram of a method 200, the method 200 being implemented in accordance with a non-limiting embodiment of the present technology. It should be noted that in some embodiments of the present technology, method 200 is executed without any affirmative actions of the user (in other words, method 200 is executed automatically). In alternative non-limiting embodiments, the user may "activate" a feature indicative of the user desire to have the method 200 executed automatically (for example, by checking an appropriate box in the settings or the like).

Step 202—Receiving a Search Query from an Electronic Device Associated with a User The method 200 begins at step 202, where the server 116 receives a search query from the electronic device 102 associated with the user. The step 202 is executed in response to the user entering a search query into the electronic device 102 using the query interface 106 of the search application 104. The server 104 receives the search query over the communications network 114.

In some non-limiting embodiments of the present technology, the search query is transmitted to the server 116 as a standard URL (i.e. a link) encoded in HTML format. In other embodiments of the present technology, the search query is transmitted in a MYSQ1 script. Latter is particularly useful in, but is not limited to, those non-limiting embodiments where the server 116 is implemented as an SQL server.

For the purposes of the illustrations to be presented herein below, it shall be assumed that the user has entered six separate queries. Naturally, in a real life situation, the user would search one query at a time—so it should be understood that the six queries presented herein below are for illustration purposes only. Also, for the ease of illustration, it shall be assumed that the electronic device 102 is the Samsung™ Galaxy™ SIII executing the search application 104 as a Yandex browser.

Scenario 1. For this scenario, it is assumed that the user is searching for images of kittens. As such, the user has entered the following query in the query interface 106: "Images of kittens".

Scenario 2. For this scenario, it is assumed that the user is searching for an episode of the TV show "Interns" to watch the episode on-line. As such, the user has entered the following query in the query interface 106: "TV Show Interns watch on-line".

Scenario 3. For this scenario, it is assumed that the user is searching for weather forecast in Saint-Petersburg. As such, the user has entered the following query in the query interface 106: "Weather Saint-Petersburg".

Scenario 4. For this scenario, it is assumed that the user is searching for a translation from English language into Russian language of the word "engagement". As such, the user has entered the following query in the query interface 106: "Translate Engagement".

Scenario 5. For this scenario, it is assumed that the user is searching for information about movies currently showing in the movie theatre "Orbit". As such, the user has entered the following query in the query interface 106: "Movie Theatre Orbit".

Scenario 6. For this scenario, it is assumed that the user is searching for information about pharmacies. As such, the user has entered the following query in the query interface 106: "Pharmacy".

The method 200 then proceeds to execution of step 204.

Step 204—Responsive to the Search Query, Generating a Search Query Result Set, the Search Query Result Set Including a Vertical Search Result The method 200 then proceeds to step 204, where in response to the search query received in step 202, the server 116 generates a search query result set, the search query result set including a vertical search result. As has been previously mentioned, the server 114 accesses the search cluster 118 in order to perform the search.

As has been described above, the search cluster 118 performs the search (or in some non-limiting embodiments multi-level meta searches, as well as vertical searches) and returns to the server 116 a ranked search results list. The ranked search results include the vertical search result (or multiple vertical searches results) or, put another way, a result set from at least one of the plurality of vertical search modules 123.

For the purposes of the illustration and using the above scenarios, it shall be assumed that as part of step 204, the server 116 receives ranked search result sets, including:

Scenario 1. For this scenario, the ranked search result set includes general search results and the search result from vertical 2 search module 126, which module as can be implemented as images service.

Scenario 2. For this scenario, the ranked search result set includes general search results and the search result from vertical N search module 128, which module can be implemented as a movies service.

Scenario 3. For this scenario, the ranked search result set includes general search results and the search result from vertical N search module 128, which module as it will be recalled can be implemented as a weather service.

Scenario 4. For this scenario, the ranked search result set includes general search results and the search result from vertical N search module 128, which module as it will be recalled can be implemented as a translation service Scenario 5. For this scenario, the ranked search result set includes general search results and the search result from vertical 1 search module 124, which module as it will be recalled can be implemented as a maps service Scenario 6. For this scenario, the ranked search result set includes general search results and several vertical search result subsets, including search result from vertical 1 search module 124, which module as it will be recalled is implemented as a map service and the search results from vertical N search module 128, which module can be implemented as a news service.

The method then proceeds to execution of step 206.

Step 206—Determining a Confidence Level that the Vertical Search Result is the Most Relevant to the Search Query The method 200 then proceeds to execution of step 206, where the server 116 determines a confidence level that the vertical search result received as part of the ranked search result set in step 204 is the most relevant to the search query received as part of step 202.

In some non-limiting embodiments of the present technology, the server 116 executes a semantic analysis in order to determine if the vertical search result received as part of the ranked search result set in step 204 is the most relevant to the search query received as part of step 202.

Recalling that in some non-limiting embodiments of the present technology, the plurality of vertical search modules 123 returns the results formatted into a widget application, the server 116 can analyze several factors associated with the widget application data as part of executing step 206.

In some non-limiting embodiments of the present technology, the server 116 can analyze (i) the data maintained within a given widget application, (ii) hierarchical position of the given widget application in the ranked search results, and (iii) the intent weight associated with the search query; (iv) determinative words contained in the search query; (v) stop words contained in the search query and (vi) frequency of a given search query and a response from the given widget application when other users perform similar search queries.

As part of analyzing the data maintained within the given widget application, the server 116 may further analyze how frequently the results are selected as response to other user queries, how often other users click through on the data maintained within the given widget application, how many times the given user has selected data maintained within the given widget application or a combination of some or all of these factors and other factors.

Next, the server 116 determines the position of the widget application within the search results set. For example, in some non-limiting embodiments of the present technology, the server 116 may determine if a given widget application is ranked on the top of the ranked search result set. In other examples, the server 116 may determine if the given widget application is within a certain N number of top results in the search result sets. The certain N number is not particularly limited and can include the first three, the first six, the first ten positions of the ranked search results and the like.

The server 116 may further analyze the intent weight associated with the given widget application. For the purposes of this description the term "intent weight" shall mean the likelihood that the user submitting the search query was intending to see data maintained within the given widget application. For the sake of example and not a limitation, in some non-limiting embodiments of the present technology, as part of processing the user query by the server 116 or the processing module 120, the search query can be parsed. Parsing of the search query may be performed for a number of different reasons, such as to break the search query into key words, to translate portions of the search query, to correct grammatical errors in the search terms, to weed out unnecessary terms and the like. In some non-limiting embodiments of the present technology, the search query is further parsed to determine a search intent parameter and a results intent parameter. Generally speaking, the search intent parameter is indicative of what the user is desirous of receiving as a response to the search query. The results intent parameter is indicative as to how the user would like to receive the search results.

How the intent parameter is determined is not particularly limited and may include analyzing some or all of the following characteristics. The server 116 may look at the determinative words associated with the search query received in step 202. For example, any of the determinative words "watch", "movie", "weather", "traffic", "image", "map" or the like may be used as an indication of the results intent parameter being associated with the particular vertical search. The server 116 may further determine if the search query received as part of step 202 contains any "stop words". For example, if the search query contains the term "torrent", it may be considered to be a "stop word" indicative of the results intent parameter not including an indication that the user is interested in a response from any of the services: images, weather, maps, traffic, videos, music or the like.

The server 116 may further analyze the relative frequency of the search query in the general search and in the vertical searches. For example, let's assume that the search string includes the term "Roses". If the term "roses" is used once out of 10,000 general searches and in the images vertical search once out of 500, the server 116 may determine that the results intent parameter is more likely to be indicative of the user being desirous of viewing images vertical search results. The server 116 may consider a number of additional parameters, such as clickability of certain search results, quantity of search results in the general search and the in the vertical search and the like.

Let's refer to the above-mentioned Scenario 2, where the user has entered a query for "Images of Kittens". Within this illustration, the server 116 may appreciate that the search intent parameter is obtaining images of kittens, while the results intent parameter is to view images (as opposed, for example, to locating stores that sell posters with kittens or locating a pet store that sells food for kittens).

Likewise, within the above-mentioned Scenario 2, where the user has entered a query for "TV Show Interns watch on-line". Within this illustration, the server 116 may appreciate that the search intent parameter is obtaining an episode of the TV show Interns available on-line, while the results intent parameter is to watch the episode (as opposed, for example, to locating information about the TV show cast).

Next, the server 116 analyzes the above-mentioned parameters to determine the confidence level that a given vertical search result (as represented by the given widget application, for example) is the most relevant to the search query received as part of step 202. For example, if a given widget application comes first in the ranked search result set and the intent weight is high, then the server 116 may assign a higher confidence level to the given widget application (and hence the associated vertical search results).

If on the other hand, the widget application comes high in the ranked search results, yet the intent weight is low, the server 116 may assign a lower confidence level to the given widget application (and hence the associated vertical search results). Similarly, if the widget application comes low in the ranked search results and the intent weight is low, the server 116 may assign a lower confidence level to the given widget application (and hence the associated vertical search results). The exact algorithm of assigning the confidence level can be pre-determined by an operator associated with the server 116 and may be amended from time to time based on empirical results, user feedback, user test groups and the like.

In some non-limiting embodiments of the present technology, the confidence level can be categorized in terms of low, medium or high. In other embodiments of the present technology, the confidence level can be categorized on a numerical scale, such as 1 to 10. In yet other embodiments of the present technology, the confidence level can be categorized in terms of percentage value—0% to 100%.

The method 200 then proceeds to execution of step 208. Step 208—Responsive to the Confidence Level Being Above a Pre-Determined Threshold, Causing the Electronic Device to Display Exclusively the Vertical Search Result The method 200 then executes step 208, where the server 116 in response to the confidence level being above a pre-determined threshold, transmits to the electronic device 102 a trigger that causes the electronic device to display exclusively the vertical search result that was deemed to be most relevant as part of step 206.

First, the server 116 compares the confidence level calculated as part of step 206 with a pre-determined threshold. How the pre-determined threshold is set is not particularly limited. In some non-limiting embodiments of the present technology an operator associated with the system 100 may set the pre-determined threshold based on an empirical review of search strategies. Alternatively, the operator of the system 100 may set the pre-determine threshold at a certain level and then amend the pre-determined threshold from time to time, based for example, on user feedback or user test groups.

Needless to say that the format of the pre-determined threshold would match the format of the confidence level described above with reference to step 204.

If the server 116 determines that the confidence level is higher than the pre-determined threshold, the server causes the electronic device 102 to display exclusively the search results from the given vertical search. For example, in some non-limiting embodiments of the present technology, the server 116 may cause the electronic device 102 to exclusively display the given widget application (and hence, exclusively display the search results form the given search vertical).

In some non-limiting embodiments of the present technology, the server creates a message in the JavaScript Object Notation (JASON) format and transmits the message to the electronic device 102, the message being instrumental in causing the electronic device 102 to display exclusively the search results from the given search vertical, which results were determined to be most relevant as part of step 206. In some non-limiting embodiments of the present technology, the message is instrumental in causing the electronic device 102 to display the widget application depicting the search results from the most relevant vertical search.

Reference will now be made to the above mentioned scenarios to illustrate the output that server 116 causes the electronic device 102 to display to the user.

Figure 6:
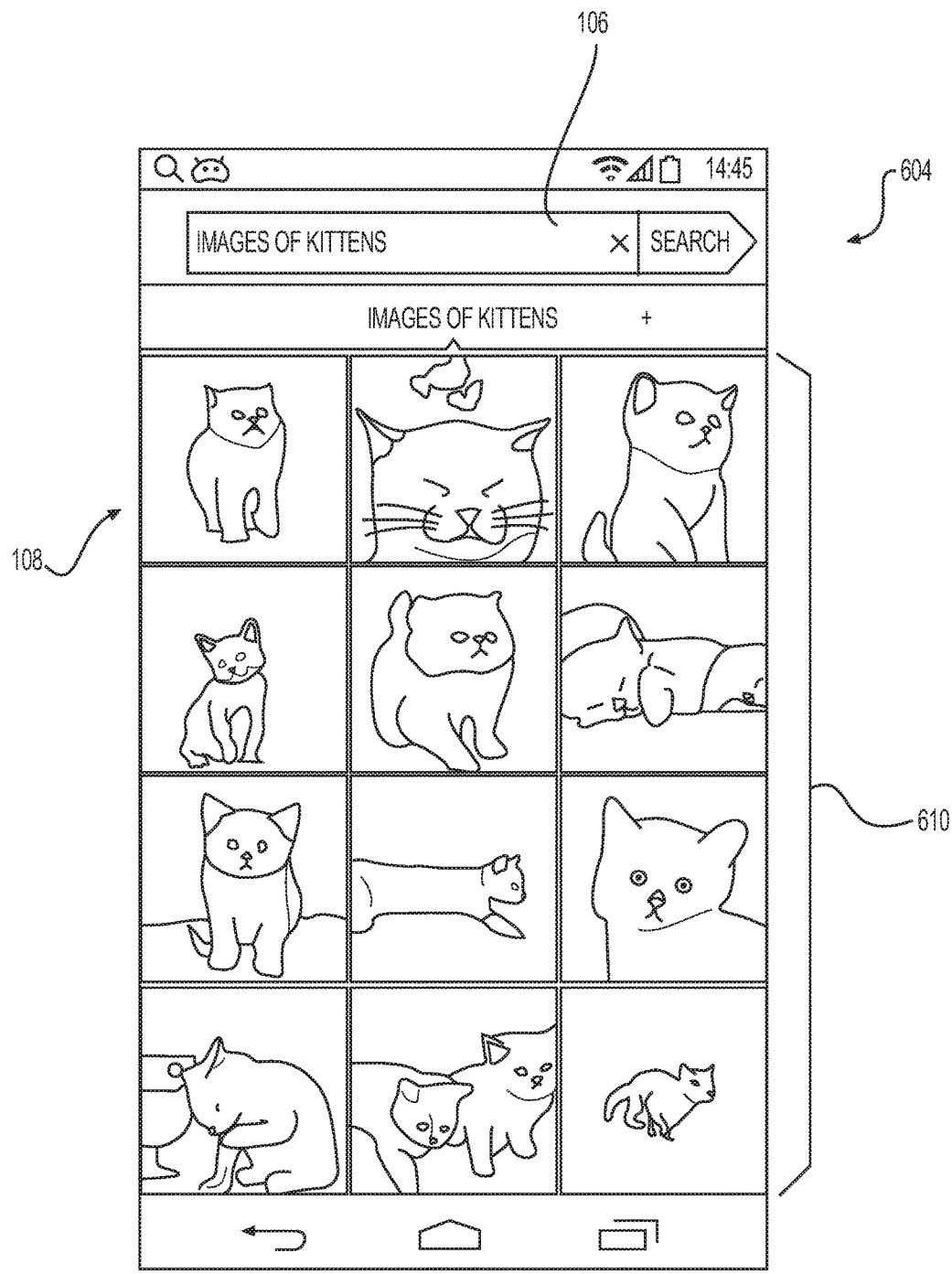
FIG. 6 depicts a screen shot that represents a search application 604, the search application 604 resultant from execution of non-limiting embodiments of the method 200 of FIG. 2.

Scenario 1. Within this scenario, the server 116 determines that the confidence level of the images vertical search results is above the pre-determined threshold and the server 116 causes the electronic device 102 to present to the user, the search application 604 a non-limiting embodiment of which is depicted with reference to FIG. 6. As depicted in FIG. 6, as part of the results interface 108, the electronic device 102 is caused to display exclusively a search vertical results set 610, the search vertical results set 610 including images responsive to the user query received as part of step 202.

Figure 7:
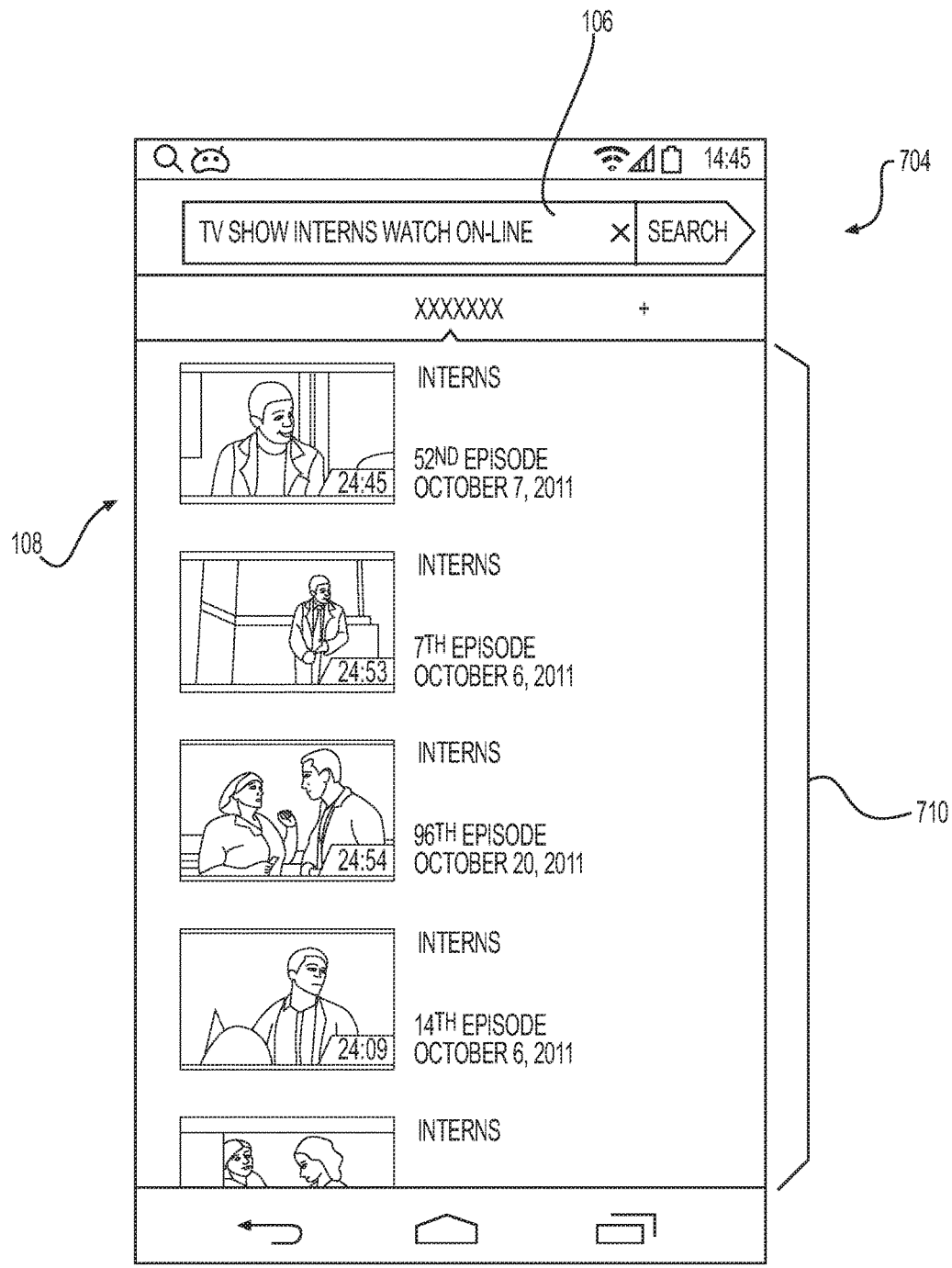
FIG. 7 depicts a screen shot that represents a search application 704, the search application 704 resultant from execution of non-limiting embodiments of the method 200 of FIG. 2.

Scenario 2. Within this scenario, the server 116 determines that the confidence level of the movies vertical search results is above the pre-determined threshold and the server 116 causes the electronic device 102 to present to the user, the search application 704 a non-limiting embodiment of which is depicted with reference to FIG. 7. As depicted in FIG. 7, as part of the results interface 108, the electronic device 102 is caused to display exclusively a search vertical results set 710, the search vertical results set 710 including TV show episodes responsive to the user query received as part of step 202.

Figure 8:
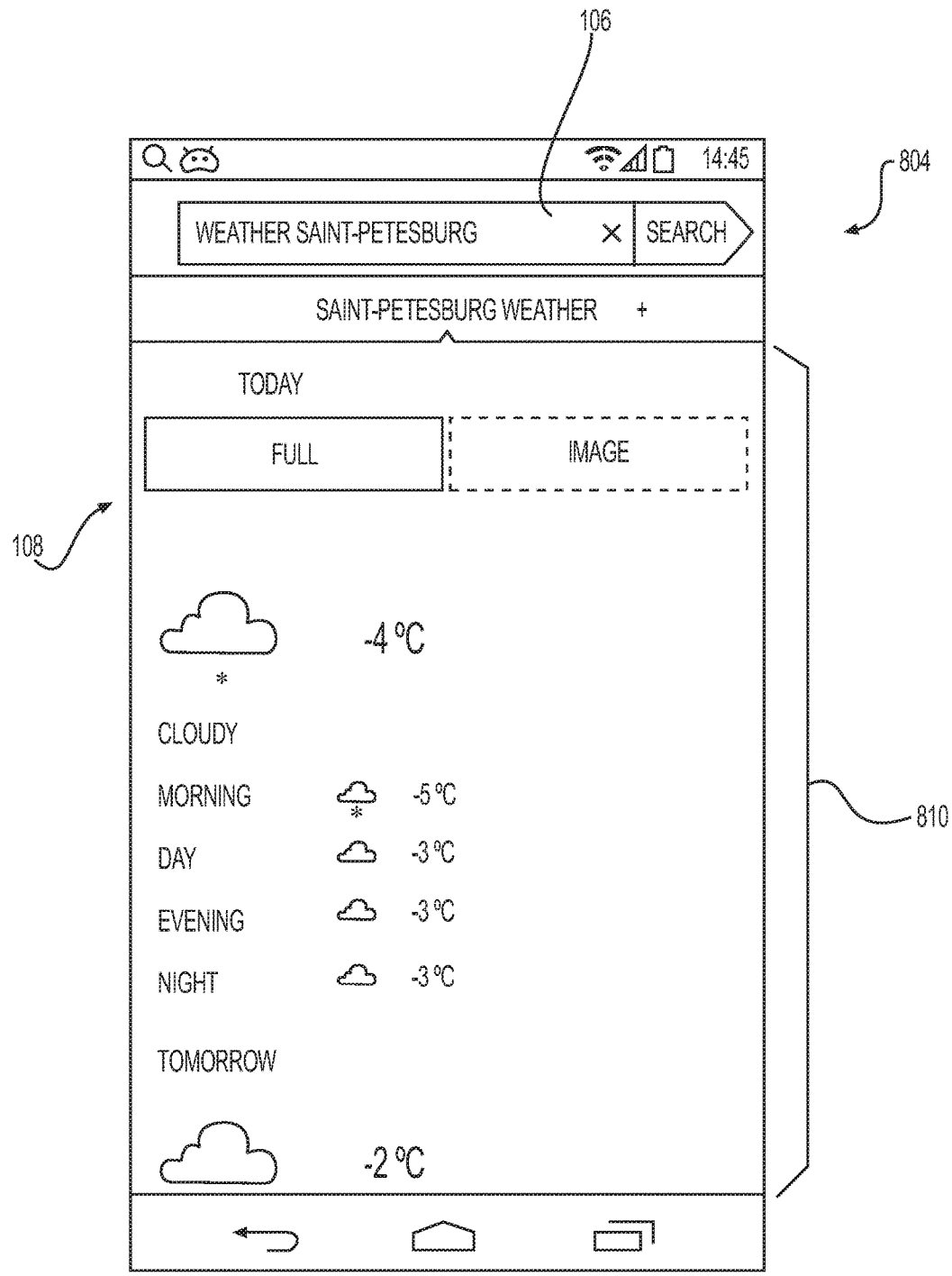
FIG. 8 depicts a screen shot that represents a search application 804, the search application 804 resultant from execution of non-limiting embodiments of the method 200 of FIG. 2.

Scenario 3. Within this scenario, the server 116 determines that the confidence level of the weather vertical search results is above the pre-determined threshold and the server 116 causes the electronic device 102 to present to the user, the search application 804 a non-limiting embodiment of which is depicted with reference to FIG. 8. As depicted in FIG. 8, as part of the results interface 108, the electronic device 102 is caused to display exclusively a search vertical results set 810, the search vertical results set 810 including weather information for Saint-Petersburg responsive to the user query received as part of step 202.

Figure 9:
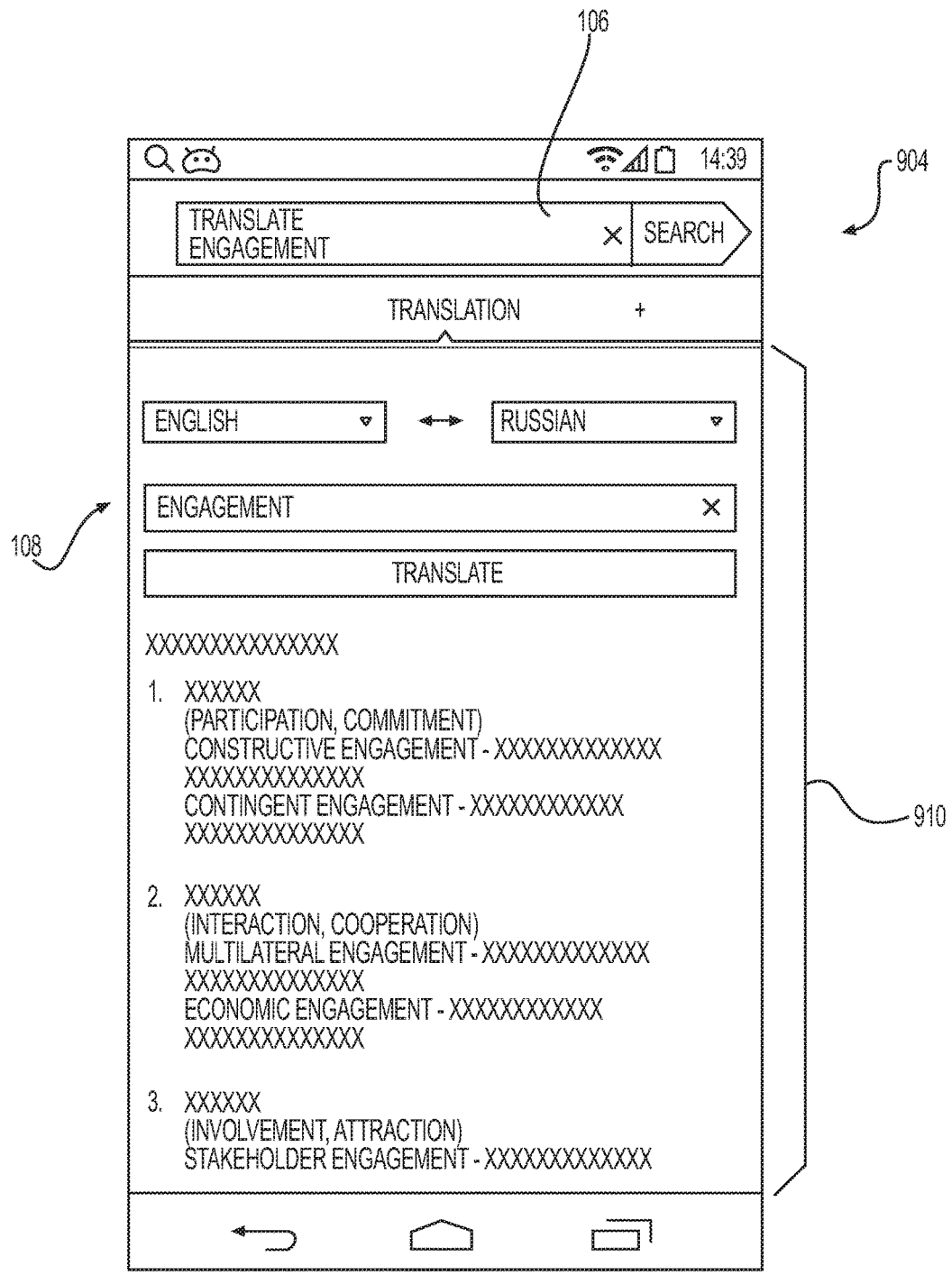
FIG. 9 depicts a screen shot that represents a search application 904, the search application 904 resultant from execution of non-limiting embodiments of the method 200 of FIG. 2.

Scenario 4. Within this scenario, the server 116 determines that the confidence level of the translation vertical search results is above the pre-determined threshold and the server 116 causes the electronic device 102 to present to the user, the search application 904 a non-limiting embodiment of which is depicted with reference to FIG. 9. As depicted in FIG. 9, as part of the results interface 108, the electronic device 102 is caused to display exclusively a search vertical results set 910, the search vertical results set 910 translation of the word "Engagement" into Russian language responsive to the user query received as part of step 202

Figure 10:
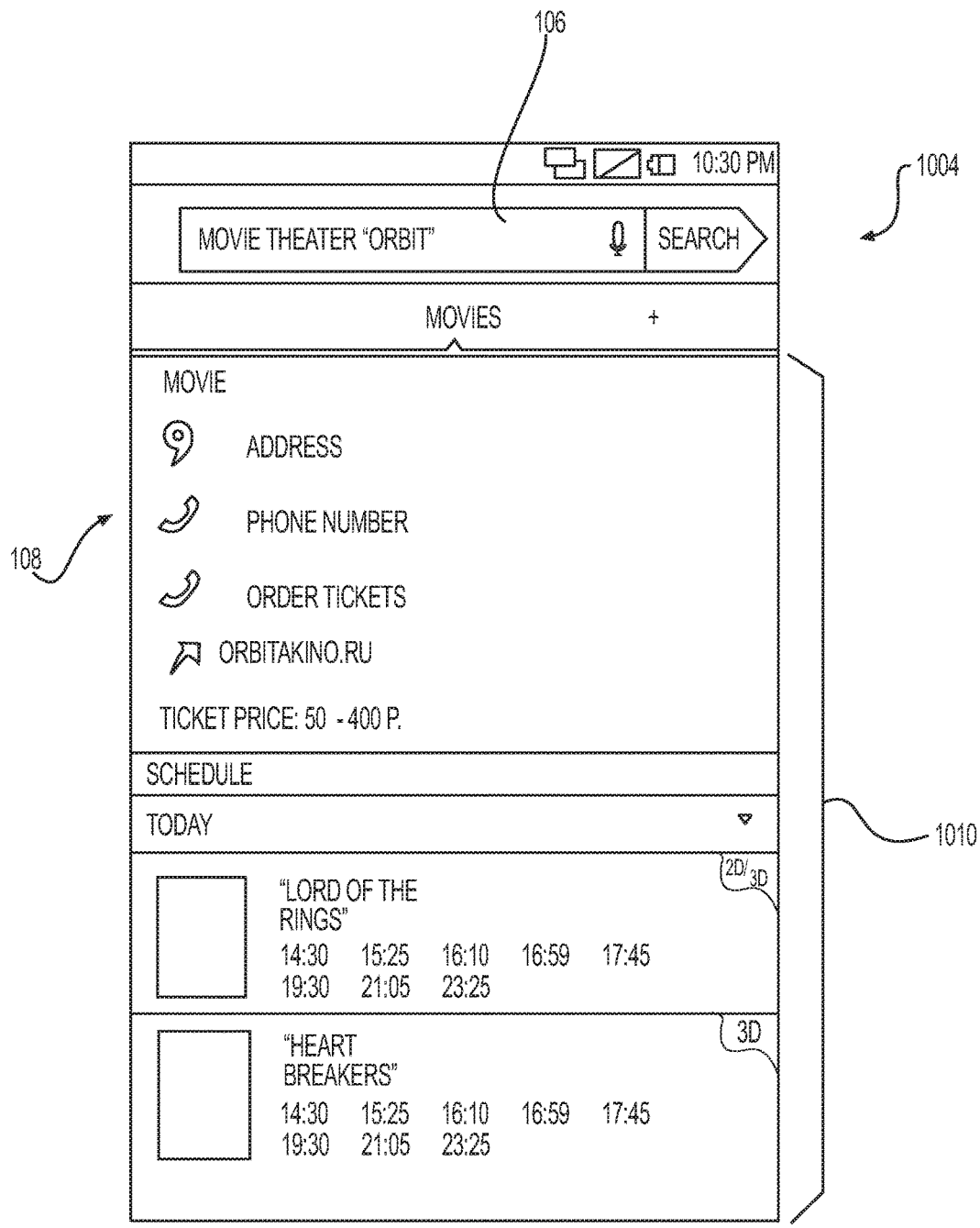
FIG. 10 depicts a screen shot that represents a search application 1004, the search application 1004 resultant from execution of non-limiting embodiments of the method 200 of FIG. 2.

Scenario 5. Within this scenario, the server 116 determines that the confidence level of the maps vertical search results is above the pre-determined threshold and the server 116 causes the electronic device 102 to present to the user, the search application 1004 a non-limiting embodiment of which is depicted with reference to FIG. 10. As depicted in FIG. 10, as part of the results interface 108, the electronic device 102 is caused to display exclusively a search vertical results set 1010, the search vertical results set 1010 including information about movies running in the movie theatre "Orbit" responsive to the user query received as part of step 202.

Returning to the description of the method 200, if the server 116 determines that the confidence level is lower than the pre-determined threshold, the server 116 causes the electronic device 102 to display to the user a standard search results page (SERP). In some non-limiting embodiments of the present technology, the standard SERP may include a ranked list of search results. In other embodiments of the present technology, the standard SERP may include a combination of the ranked search results and one or more widget applications displaying search results from one or more vertical searches.

Scenario 6. Within this scenario, the server 116 determines that there are two vertical search result sets—the maps vertical service and the news vertical service. However, the server 116 further determines that the confidence level of either vertical search service is below the pre-determined threshold. As such, the server 116 causes the electronic device 102 to present to the user, a general SERP 1104 a non-limiting embodiment of which is depicted with reference to FIG. 11.

Figure 11:
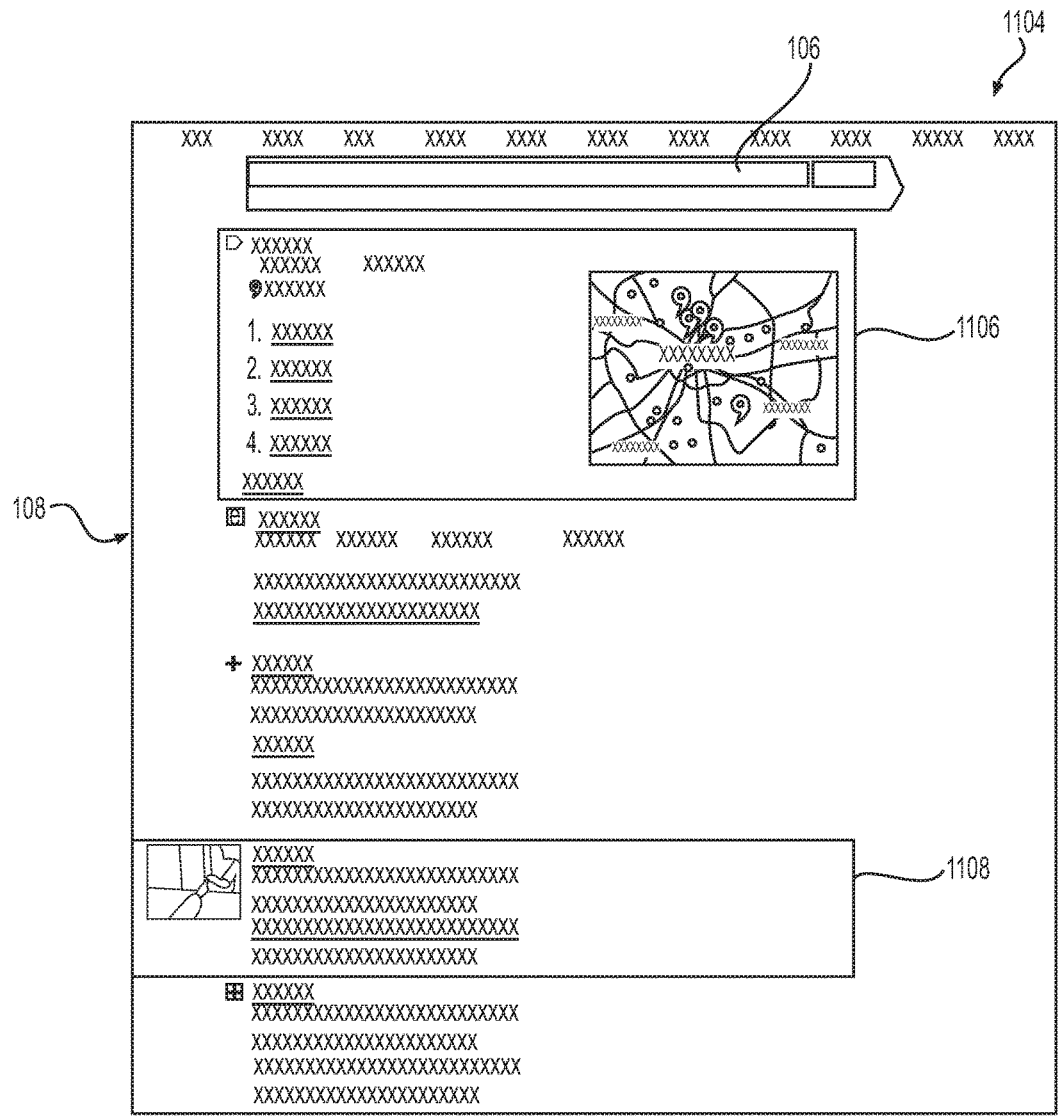
FIG. 11 depicts a screen shot that represents a search application 1104, the search application 1104 screen resultant from execution of non-limiting embodiments of the method 200 of FIG. 2.

As depicted in FIG. 11, as part of the results interface 108, the electronic device 102 is caused to display the general SERP 1104 that includes a first widget application 1106 responsible for displaying results from the maps search vertical and a second widget application 1108 responsible for displaying results from the news search vertical. The whole general SERP 1104 is responsive to the search query that was received as part of step 202. It should be apparent that the exact depiction and the content of the general SERP 1104 is provided as a mere illustration In order to cause the electronic device 102 to display the search results, the server 116 transmits a trigger to the electronic device 102, the trigger being instrumental in causing the electronic device 102 to display search results, as has been described above.

The execution of method 200 then finishes or, alternatively, loops back to step 202, if the user enters another search query.

Figure 3:
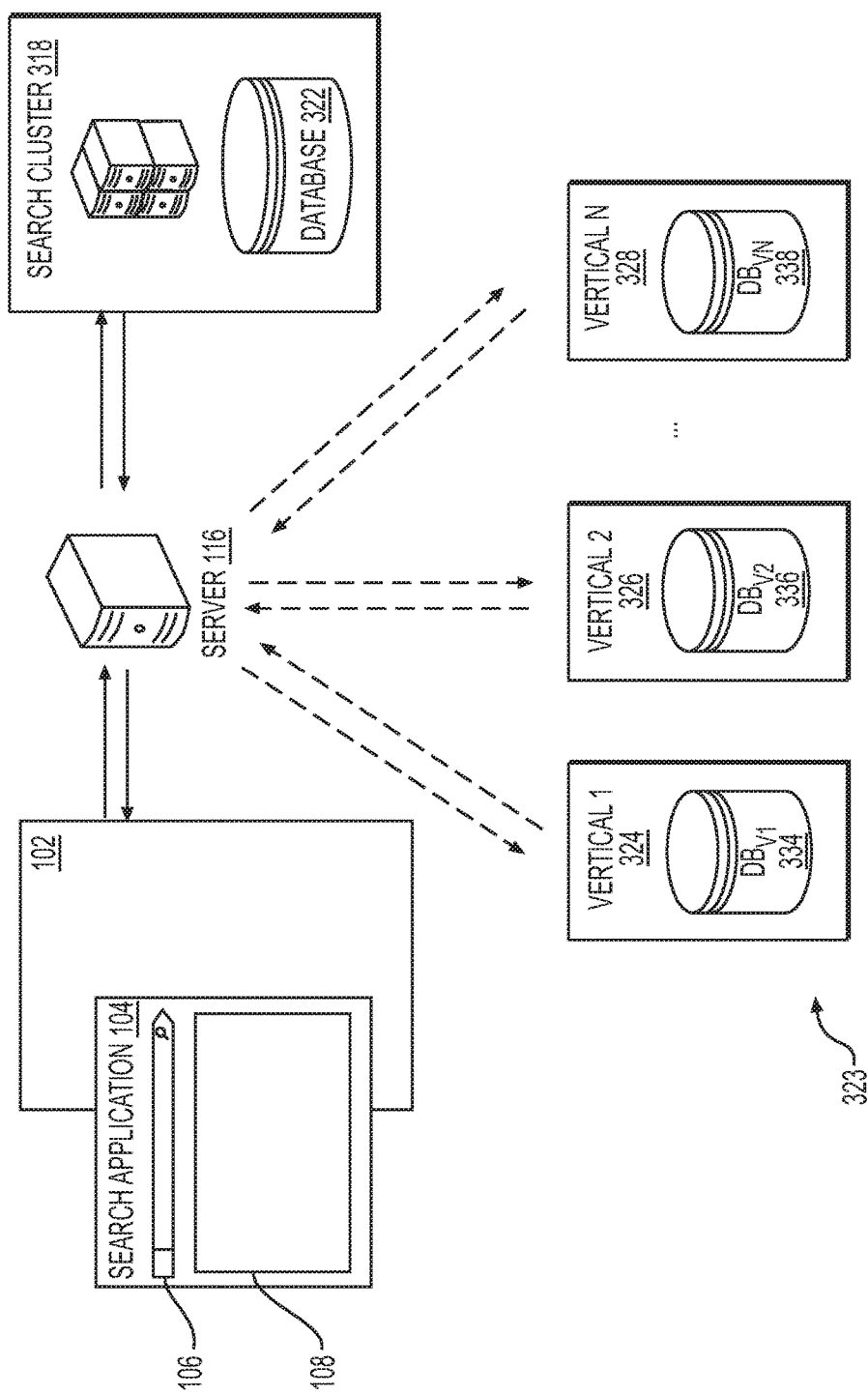
FIG. 3 is a block diagram depicting a system 300, the system 300 being implemented in accordance with another non-limiting embodiment of the present technology.

According to another non-limiting embodiment of the present technology, there is provided a method of executing a search and receiving search results, the method executable at the electronic device 102 (of either the FIG. 1 or FIG. 3).

Figure 12:
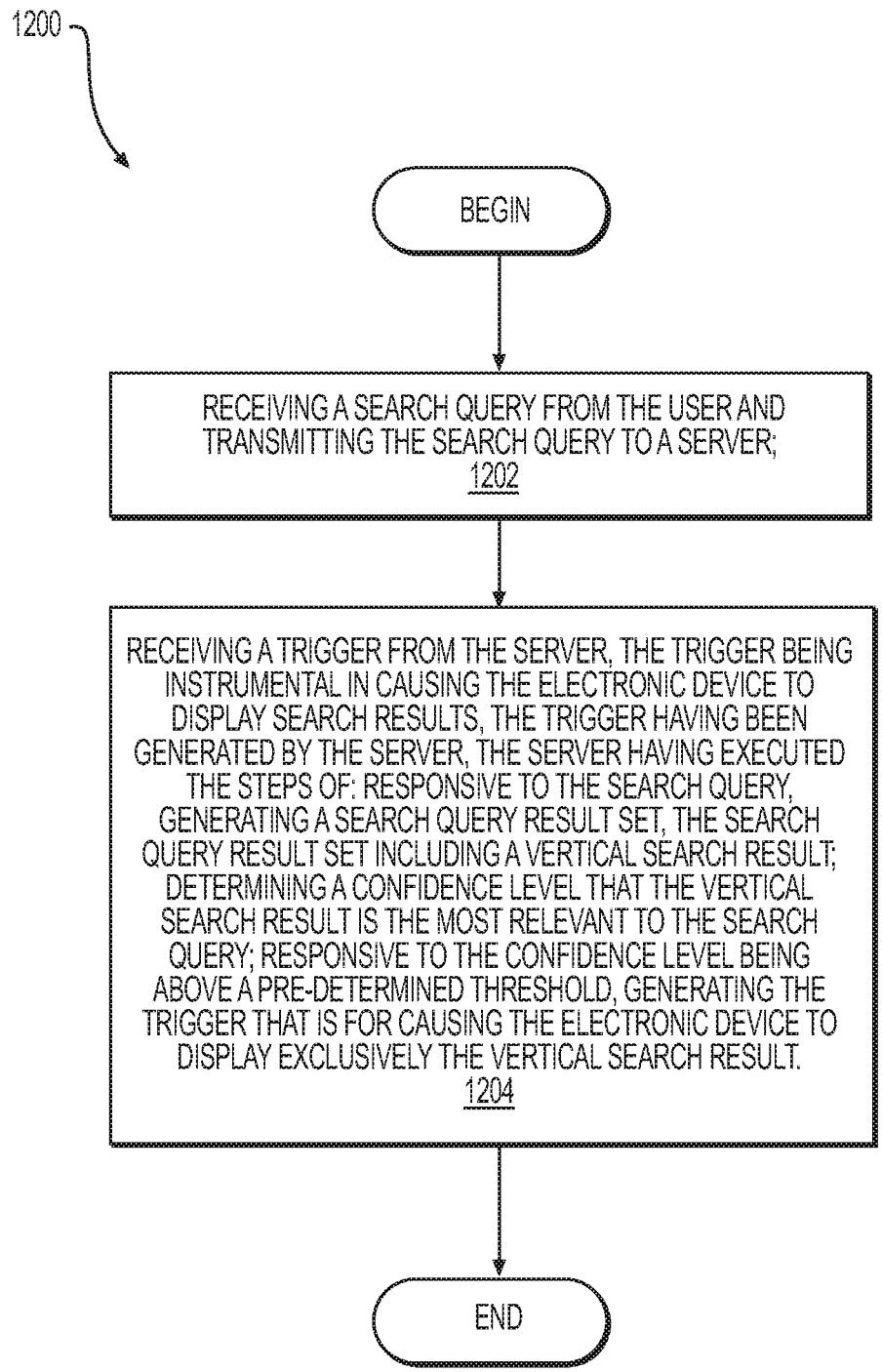
FIG. 12 depicts a flow chart of a method 1200, the method 1200 being implemented in accordance with non-limiting embodiments of the present technology.

With reference to FIG. 12, there is depicted a flow chart of a method 1200, the method 1200 being implemented in accordance with non-limiting embodiments of the present technology. The electronic device 102 comprises computer usable information storage medium that includes computer-readable instruction, which instructions when executed, cause the electronic device 102 to execute the method steps of the method 1200.

The method 1200 starts at step 1202, where the electronic device receives a search query from the user and transmits the search query to the server 116. How the electronic device 102 receives the search query and transmits same to the server 116 has been described at length above.

The method 1200 then proceeds to step 1204 where the electronic device 102 receives a trigger from the server 116, the trigger being instrumental in causing the electronic device 102 to display search results, the trigger having been generated by the server 116.

It is noted that the trigger has been generated by the server 116 by executing the method 200 described above.

Some technical effects of non-limiting embodiments of the present technology may include provision of more relevant search results to the user. Other technical effects of non-limiting embodiments of the present technology may include ability to provide the user with the most relevant search results, while enabling the user to obtain the most relevant search results with fewer clicks.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of conducting a search and presenting results, the method executable at a server, the method comprising:

receiving a search query from an electronic device associated with a user;

responsive to the search query, generating a search query result set, the search query result set being a ranked result set and including a general search result and a vertical search result, each of the general search result and the vertical search result having been generated by its respective search source, the vertical search result being represented as a widget application within said ranked result set;

determining an intent weight associated with the search query;

determining a confidence level that the vertical search result is the most relevant response to the search query based on an analysis of the search query, the vertical search result and at least one of: (i) data maintained within the widget application, (ii) a hierarchical position of the widget application within the ranked result set, and (iii) the intent weight associated with the search query; (iv) determinative words associated with the search query; (v) stop words associated with the search query and (vi) a frequency of the search query and a response from the widget application combination when other users perform similar search queries;

responsive to the confidence level being above a pre-determined threshold, causing the electronic device to display exclusively the vertical search result represented as a widget application; and responsive to the confidence level being below the predetermined threshold, causing the electronic device to display both the general search result and the vertical search result.

2. The method of claim 1, wherein said generating the search query result set comprises transmitting the search query to a search cluster and receiving the ranked search result set therefrom, the search cluster having performed a general search.

3. The method of claim 2, wherein said generating the search query result set further comprises transmitting the search query to at least one vertical search module and receiving the vertical search result therefrom.

4. The method of claim 1, wherein said generating the search query result set comprises transmitting the search query to a search cluster and receiving the ranked search result set therefrom, the search cluster being configured to perform a general search and a vertical search.

5. The method of claim 1, wherein said generating the search query result set comprises transmitting the search query to a search cluster and receiving the ranked search result set therefrom, the search cluster being configured to perform a general search and a vertical search, and wherein the general search is performed as a multi-level meta search.

6. The method of claim 1, wherein said determining the intent weight associated with the search query comprises parsing the search query to determine a search intent parameter and a results intent parameter.

7. The method of claim 1, wherein said determining the confidence level comprises analyzing the hierarchical position of the widget application and the intent weight.

8. The method of claim 7, further comprising determining if the widget application is within the top N results of the ranked search results.

9. The method of claim 1, wherein determining the intent weight comprises analyzing the search query for determinative words.

10. The method of claim 1, further comprising: responsive to the confidence level being below the pre-determined threshold, causing the electronic device to display a standard search engine results page (SERP).

11. The method of claim 10, wherein said causing the electronic device to display the standard SERP comprises causing the electronic device to display both the general search result and the vertical search result.

12. The method of claim 1, wherein said causing the electronic device to display exclusively the vertical search result is executed without receiving an affirmative action from the user.

13. The method of claim 1, wherein execution of the method is triggered upon the user activating a feature associated with the method.

14. The method of claim 13, wherein said activating comprises selecting the feature in a settings menu.

15. The method of claim 1, wherein said causing the electronic device to display exclusively the vertical search result comprises transmitting a trigger to the electronic device, the trigger being instrumental in causing the electronic device to display exclusively the vertical search result.

16. A system comprising a computer usable information storage medium that includes computer-readable instructions, the server configured to:
receive a search query from an electronic device associated with a user;
responsive to the search query, generate a search query result set, the search query result set being a ranked result set and including a general search result and a vertical search result, each of the general search result and the vertical search result having been generated by its respective search source, the vertical search result being represented as a widget application within said ranked result set;
determine an intent weight associated with the search query;
determine a confidence level that the vertical search result is the most relevant response to the search query based on an analysis of the search query and the vertical search result and by analyzing at least one of: (i) data maintained within the widget application, (ii) a hierarchical position of the widget application within the ranked result set, and (iii) the intent weight associated with the search query; (iv) determinative words associated with the search query; (v) stop words associated with the search query and (vi) a frequency of the search query and a response from the widget application combination when other users perform similar search queries;
responsive to the confidence level being above a predetermined threshold, cause the electronic device to display exclusively the vertical search result represented as a widget application; and
responsive to the confidence level being below the predetermined threshold, cause the electronic device to display both the general search result and the vertical search result.

17. The system of claim 16, wherein to generate the search query result set, the server is configured to transmit the search query to a search cluster and to receive the ranked search result set therefrom, the search cluster being configured to perform a general search and a vertical search.

18. The system of claim 16, wherein in order to determine the intent weight associated with the search query, the server is configured to parse the search query to determine a search intent parameter and a results intent parameter.

19. The system of claim 16, wherein to determine the confidence level, the server is configured to analyze the hierarchical position of the widget application and the intent weight.

20. The system of claim 16, wherein to determine the intent weight, the server is configured to analyze the search query for determinative words.

* * * * *